United States Patent
Venus et al.

(10) Patent No.: US 7,052,224 B2
(45) Date of Patent: May 30, 2006

(54) FASTENER ASSEMBLY WITH MOLDED INTERNAL HELICAL FLUTES

(76) Inventors: Donald W. Venus, 4702 Hawkins Rd., Richfield, OH (US) 44286; James Skufca, 19760 Battersea Blvd., Rocky River, OH (US) 44116

( * ) Notice: Subject to any disclaimer, the term of this patent is extended or adjusted under 35 U.S.C. 154(b) by 0 days.

(21) Appl. No.: 10/279,434

(22) Filed: Oct. 24, 2002

(65) Prior Publication Data

US 2003/0077147 A1  Apr. 24, 2003

Related U.S. Application Data

(60) Provisional application No. 60/335,079, filed on Oct. 24, 2001.

(51) Int. Cl.
*F16B 21/00* (2006.01)
(52) U.S. Cl. .................................. 411/512; 411/339
(58) Field of Classification Search ................ 411/339, 411/453, 512, 436, 456, 511; 403/280, 282; 24/706.3, 706.4, 706.9
See application file for complete search history.

(56) References Cited

U.S. PATENT DOCUMENTS

| | | | | |
|---|---|---|---|---|
| 475,407 A | * | 5/1892 | Marsh | ........................ 411/453 |
| 2,056,309 A | * | 10/1936 | Osenberg | ..................... 411/453 |
| 2,223,871 A | * | 12/1940 | Johnson | ....................... 411/453 |
| 3,115,804 A | * | 12/1963 | Johnson | ....................... 411/338 |
| 4,089,612 A | * | 5/1978 | Mazzeo | ........................ 403/361 |
| 4,600,344 A | * | 7/1986 | Sutenbach et al. | ........... 411/435 |
| 4,693,248 A | * | 9/1987 | Failla | .......................... 606/220 |
| 4,756,654 A | * | 7/1988 | Clough | ....................... 411/437 |
| 4,826,379 A | * | 5/1989 | Norden | ....................... 411/437 |
| 5,186,590 A | * | 2/1993 | Oldendorf | ..................... 411/45 |
| 5,190,424 A | * | 3/1993 | Kazino et al. | .............. 411/171 |
| 5,575,601 A | | 11/1996 | Skufca et al. | |

* cited by examiner

*Primary Examiner*—Flemming Saether
(74) *Attorney, Agent, or Firm*—Fay, Sharpe, Fagan, Minnich & McKee, LLP

(57) ABSTRACT

A fastener assembly for securing a first molded component to a second molded component is provided. The fastener assembly includes a stud that is a molded part of the first component and extends outward from the first component and a cylindrical wall that is a molded part of the second component. A longitudinal bore is defined by the cylindrical wall and at least one flute extends radially from the cylindrical wall into the bore and longitudinally along the cylindrical wall in a helical manner. The flute secures the stud in the bore of the cylindrical wall upon insertion of the stud into the bore. A method of fastening a first component to a second component is also provided.

20 Claims, 3 Drawing Sheets

FASTENER ASSEMBLY WITH MOLDED INTERNAL HELICAL FLUTES

CROSS REFERENCE TO RELATED APPLICATION

This application claims the benefit of U.S. Provisional application Ser. No. 60/335,079, filed on Oct. 24, 2001.

FIELD OF THE INVENTION

The present invention relates to the art of fasteners including internal helical flutes. More particularly, the present invention relates to a fastener assembly for plastic components that facilitates tool-free fastening.

BACKGROUND OF THE INVENTION

There are a variety of fasteners used to secure plastic components. These fasteners include screws and bolts that are used with one another or with molded bosses. However, these fasteners often require tools to secure them to the plastic components and are labor intensive.

Other fasteners, such as studs that engage orifices and molded plastic fasteners, may exhibit reduced holding capability or may involve complex, and therefore expensive, molds in order to manufacture them.

As a result, there is a need for a fastener for plastic components that may overcome the disadvantages of the prior art by being easily molded, while having good strength and the capability to be assembled without special tools.

BRIEF SUMMARY OF THE INVENTION

In an exemplary embodiment of the present invention, a fastener assembly for securing a first molded component to a second molded component is provided. The fastener assembly includes a stud that is a molded part of the first component and extends outward from the first component and a cylindrical wall that is a molded part of the second component. A longitudinal bore is defined by the cylindrical wall and at least one flute extends radially from the cylindrical wall into the bore and longitudinally along the cylindrical wall in a helical manner. The flute secures the stud in the bore of the cylindrical wall upon insertion of the stud into the bore.

The cylindrical walls include a top and a base and the flute extends longitudinally in a helical manner from the top to the base. In addition, the flute includes a curved surface and a planar surface that intersect to form a crest. The fit between the stud and the crest of the flute upon insertion of the stud into the bore may be an interference fit. Moreover, a plurality of flutes may be spaced apart and extend parallel to one another in a helical manner along the cylindrical wall.

In another exemplary embodiment of the present invention, a fastener assembly includes a first molded component and a second molded component. A stud is permanently secured to and extends outward from the first molded component. A cylindrical wall is permanently secured to the second molded component and defines a longitudinal bore along its inner diameter that receives the stud. The cylindrical wall also defines a plurality of flutes spaced apart from one another that extend longitudinally in a helical manner along the wall and radially from the wall into the bore.

Each flute includes a curved surface and a planar surface that intersect to form a crest that deforms upon insertion of the stud into the bore. The angle of each flute with a radial axis of the cylindrical wall is between about 30 degrees and about 360 degrees, more preferably between about 60 degrees and 180 degrees, and most preferably between about 90 degrees and 120 degrees. The cylindrical wall may extend outward from the second component and the fit between the stud and the flutes when the stud is inserted into the longitudinal bore may be an interference fit.

In yet another exemplary embodiment of the present invention, a plurality of fastener assemblies is provided in accordance with the above disclosure. At least one additional stud is permanently secured to the first molded component and at least one additional cylindrical wall is permanently secured to the second molded component.

In still another exemplary embodiment of the present invention, a method of fastening a first component to a second component is provided. The method includes the steps of providing a first component and forming a stud on the first component. A second component is provided and a cylindrical wall that defines a longitudinal bore is formed on the second component. At least one helical flute is formed on the cylindrical wall and the helical flute extends radially into the longitudinal bore. The stud is aligned with the longitudinal bore and is pressed into the longitudinal bore, allowing the flutes to secure the stud in the longitudinal bore.

There may be a plurality of flutes formed on the cylindrical wall that are spaced apart in a parallel manner. Moreover, at least one additional stud may be formed on the first component and at least one corresponding additional cylindrical wall may be formed on the second component.

There are other objects and features of the invention, which will be apparent from the following description and claims.

BRIEF DESCRIPTION OF THE FIGURES

The following is a brief description of the drawings, which are presented for the purpose of illustrating the invention and not for the purpose of limiting the same, and wherein.

DETAILED DESCRIPTION OF THE INVENTION

Figure 1:
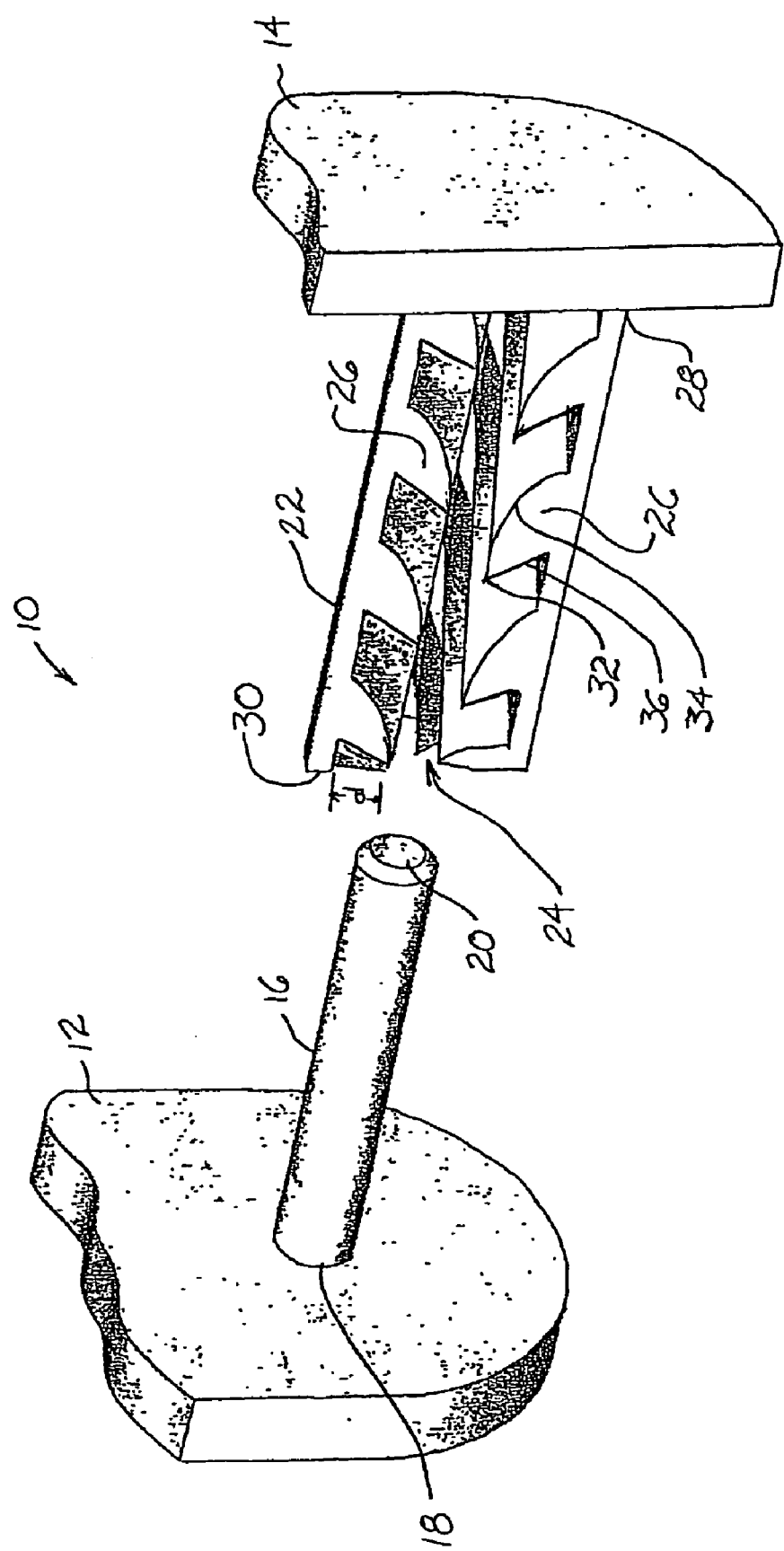
FIG. 1 is a perspective view, partially in section, of a fastener assembly of the present invention.

Referring now to the drawings, wherein the showings are for purposes of illustrating preferred embodiments of the invention and not for the purpose of particularly limiting the same, FIG. 1 shows a fastener assembly 10 that joins a first component 12 to a second component 14. The fastener assembly 10 includes a stud 16 that is a molded part of the first component 12 and extends outward from the first component 12. The stud 16 is substantially smooth and may be solid or hollow, depending on design considerations. The stud 16 includes a base 18, located at the juncture of the stud 16 and the first component 12, and a tip 20.

Figure 4:
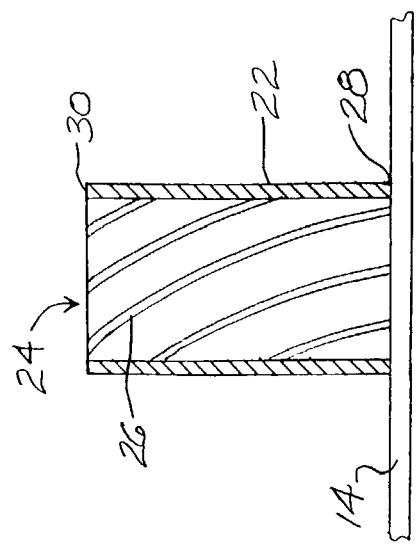
FIG. 4 is sectional view of the component of FIG. 3 taken along line F4—F4.
Figure 3:
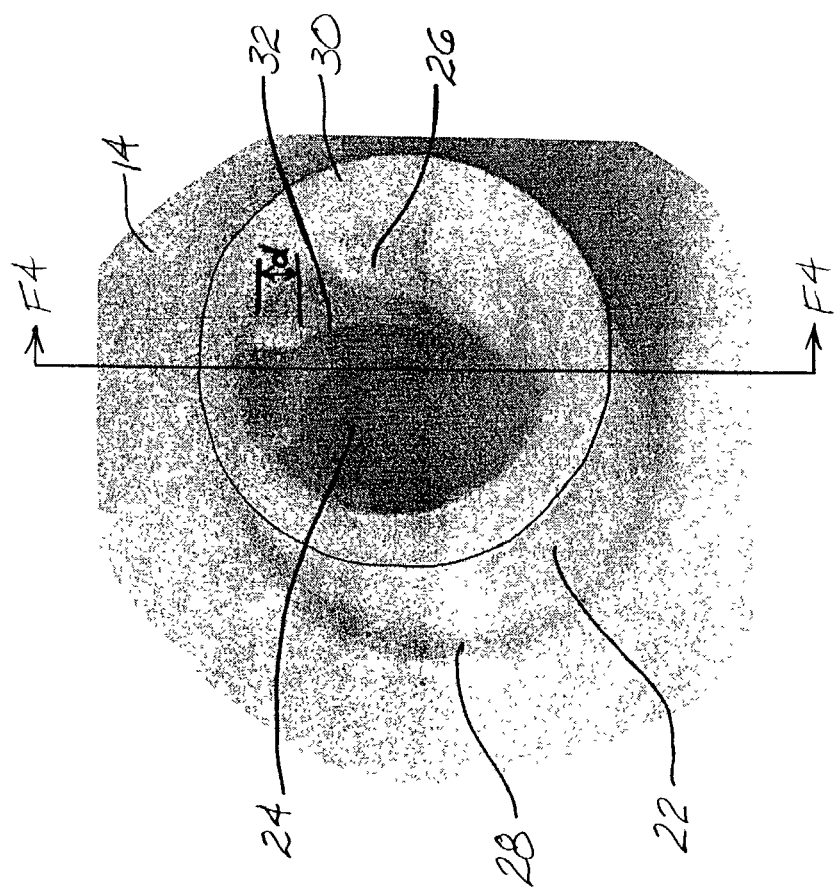
FIG. 3 is a top perspective view of a component of the fastener assembly of FIG. 1.

With additional reference to FIGS. 3 and 4, the fastener assembly 10 also includes a cylindrical wall 22 that is a molded part of the second component 14. The cylindrical wall 22 may extend out from the second component 14 (as shown) or into the second component 14. The cylindrical wall 22 defines a longitudinal bore 24 along its inner diameter having an open end. Extending radially into the bore 24 from the wall 22 in a helical manner is at least one flute or rib 26.

The wall 22 includes a base 28 at the juncture of the wall 22 and the second component 14, and a top 30. The flute 26 commences at the top 30 of the wall 22 and extends to the base 28. The angle of the flute 26 with a radial axis of the cylindrical wall 22 is between about 30 degrees and about 360 degrees, more preferably between about 60 degrees and 180 degrees, and most preferably between about 90 degrees and 120 degrees. The flute 26 may be of right-hand, i.e., extending down to the right, or left-hand, i.e., extending down to the left, orientation. Of course, more than one flute 26 may be present, as shown in the figures, and in such a case, the flutes 26 extend in a spaced parallel manner, curving from the top 30 of the wall 22 to the base 28.

Each flute 26 includes a crest 32 that is formed by the intersection of a curved surface 34 of the flute with a planar surface 36. The surfaces defining a bisecting line therebetween which is inclined in a direction towards the open end of the bore and; the angle of intersection may be approximately 90 degrees or less, thus leading to a relatively sharp crest 32. The sharpness of the crest 32 allows the flute 26 to grip the stud 16 more tightly.

Figure 2:
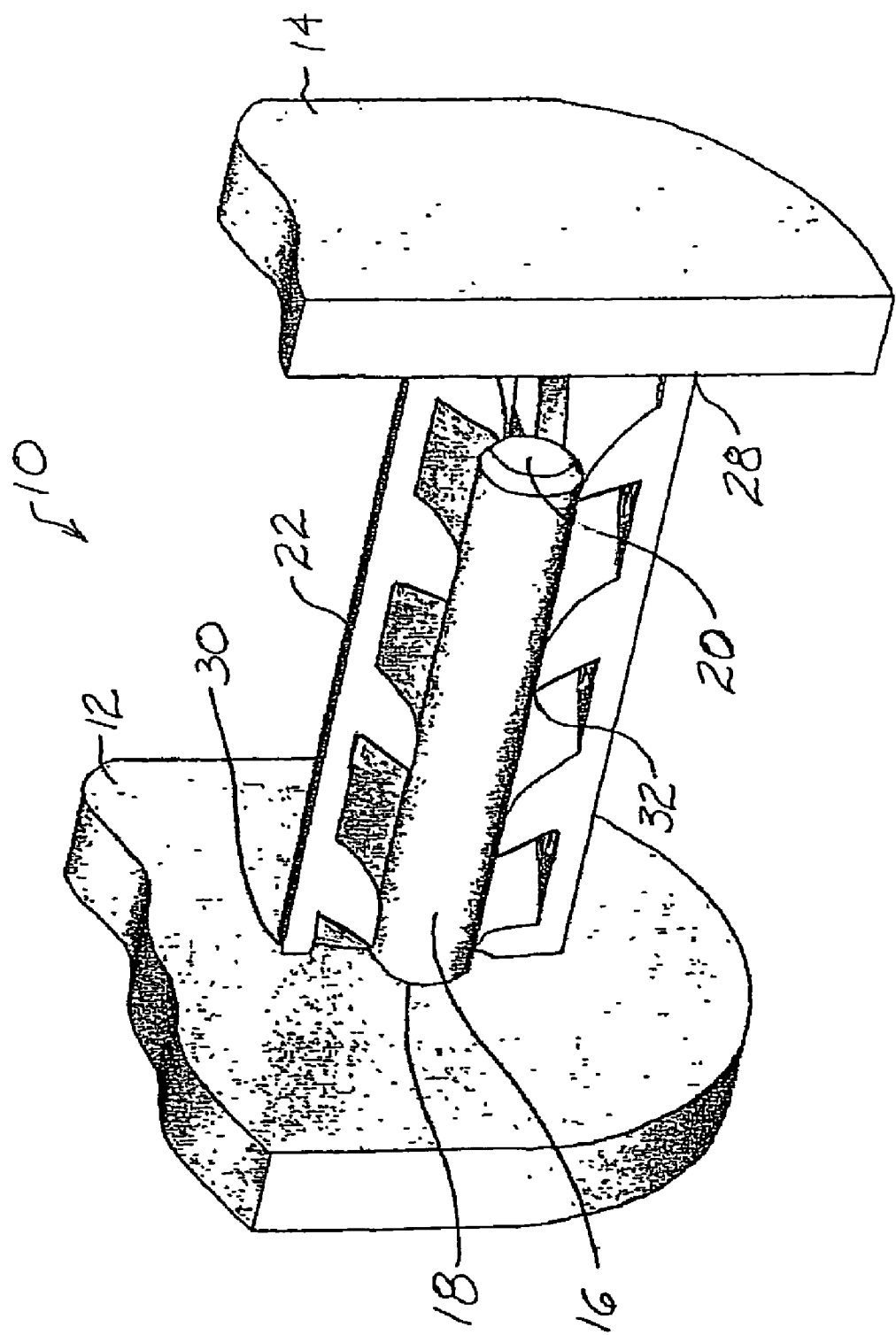
FIG. 2 is a perspective view, partially in section, of the fastener assembly of FIG. 1 in an assembled state.

The flutes 26 thus extend about the inner diameter of the cylindrical wall 22 and are of a depth d to produce an interference fit with the stud 16. Turning to FIG. 2, upon assembly of the fastener 10 the stud 16 extends into the bore 24 of the cylindrical wall 22 and is secured by the flutes 26. The flutes 26 deform slightly to grip the stud 16, thus allowing the interference fit to prevent separation of the assembled fastener 10.

For an optimum fit, the cylindrical wall 22 may be longer than the stud 16, whereby the top 30 of the wall 22 contacts the first component 12 and the tip 20 of the stud 16 does not bottom out or contact the second component 14. Depending on the specific design considerations, the stud 16 may bottom out or it may be longer than the cylindrical wall 22.

The helical design of the flutes 26 extending from the cylindrical wall 22 provide a secure connection between the wall 22 and the stud 16, making it difficult to get the fastener apart. Moreover, the stud 16 can be pressed into the bore 24 of the cylindrical wall 22 without the use of any specialized tools. To prevent the rotation of the fastener 10 and thus optimize its strength, more than one fastener 10 may be used in a particular design. For example, two fasteners 10 may be placed close to one another to cooperate in securing a first component 12 to a second component 14. In such a situation, a second stud is formed on the first component 12 and a second cylindrical wall is formed on or in the second component 14, in which these additional members conform to the above detailed description.

It will be appreciated that the components of the fastener 10 may be formed in the mold. The stud 16 may thus be molded with the first component 12, and the cylindrical wall 22 and the helical flutes 26 molded with the second component 14. As a result, the fastener 10 may be of any polymeric material, whether the same as the components 12 and 14, or different than the components 12 and 14 through the use of multiple-material molding techniques as known in the art.

In accordance with the present invention, a method of fastening components 12 and 14 is also provided. The method corresponds to FIGS. 1–4 above and includes the steps of forming a stud 16 on a first component 12. A cylindrical wall 22 is formed on or in a second component 14 and the wall 22 defines a longitudinal bore 24. Helical flutes 26 extend radially inward from the wall 22 into the bore 24. An interference fit is produced between the stud 16 and the flutes 16 and the stud 16 is aligned with the bore 24. The stud 16 is pressed into the bore 24 of the cylindrical wall 22, whereupon the flutes 26 secure the stud 16 in the wall 22, thereby fastening the first component 12 to the second component 14. Of course, multiple studs 16 with corresponding multiple cylindrical walls 22 may be formed and used to secure the first component 12 to the second component 14.

The invention has been described with reference to preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A fastener assembly for securing a first molded component to a second molded component, comprising:
   a stud that is a molded part of the first component and extends outward from the first component, wherein the stud is substantially smooth;
   a cylindrical wall that is a molded part of the second component;
   a longitudinal bore defined by the cylindrical wall; and
   at least one flute extending radially from the cylindrical wall into the bore and longitudinally along the cylindrical wall in a helical manner, wherein the flute includes a crest formed by the intersection of two surfaces, at least one of which is curved, the angle of intersection being 90 degrees or less, whereby the flute secures the stud in the bore of the cylindrical wall upon insertion of the stud into the bore through an open end of said bore, wherein the intersection of the two surfaces define a bisector line which is inclined in a direction towards said open end of said bore.

2. The fastener assembly of claim 1, wherein the cylindrical wall includes a top and a base and the flute extends longitudinally in a helical manner from the top to the base.

3. The fastener assembly of claim 1, wherein the flute includes the curved surface and a planar surface that intersect to form the crest.

4. The fastener assembly of claim 3, wherein the fit between the stud and the crest of the flute upon insertion of the stud into the bore is an interference fit.

5. The fastener assembly of claim 1, wherein the at least one flute includes a plurality of flutes.

6. The fastener assembly of claim 5, wherein the flutes are spaced apart and extend parallel to one another in a helical manner.

7. The fastener assembly of claim 1, further comprising a plurality of fastener assemblies, wherein at least one additional stud is a molded part of the first component and at least one additional cylindrical wall is a molded part of the second component.

8. A fastener assembly, comprising:
   a first molded component;
   a stud permanently secured to and extending outward from the first molded component, wherein the stud is substantially smooth;
   a second molded component; and
   a cylindrical wall that is permanently secured to the second molded component, which defines a longitudinal bore along its inner diameter that receives the stud through an open end of said bore, and defines a plurality of flutes spaced apart from one another that extend longitudinally in a helical manner along the wall and radially from the wall into the bore, wherein at least one of the flutes includes a crest formed by the intersection of two surfaces, at least one of which is curved, the angle of intersection being 90 degrees or less wherein the intersection of the two surfaces define a bisector line which is inclined in a direction towards said open end of said bore.

9. The fastener assembly of claim 8, wherein each flute includes a curved surface and a planar surface that intersect to form a crest that deforms upon insertion of the stud into the bore.

10. The fastener assembly of claim 8, wherein each flute helically extends along the cylindrical wall through an angle between about 30 degrees and 360 degrees.

11. The fastener assembly of claim 8, wherein the stud is a molded part of the first component.

12. The fastener assembly of claim 8, wherein the cylindrical wall is a molded part of the second component.

13. The fastener assembly of claim 12, wherein the cylindrical wall extends outward from the second component.

14. The fastener assembly of claim 8, wherein the stud engages the flutes and the fit between the stud and the flutes is an interference fit.

15. The fastener assembly of claim 8, further comprising a plurality of fastener assemblies, wherein at least one additional stud is permanently secured to the first molded component and at least one additional cylindrical wall is permanently secured to the second molded component.

16. A method of fastening a first component to a second component, comprising the steps of:
   providing a first component;
   forming a substantially smooth stud on the first component;
   providing a second component;
   forming a cylindrical wall on the second component that defines a longitudinal bore having open end;
   forming at least one helical flute on the cylindrical wall, wherein the helical flute extends radially into the longitudinal bore, and the flute includes a crest formed by the intersection of two surfaces, at least one of which is curved wherein the intersection of the two surfaces define a bisector line which is inclined in a direction towards said open end of said bore;
   aligning the stud with the longitudinal bore; and
   pressing the stud into the longitudinal bore through the open end, whereupon the flutes secure the stud in the longitudinal bore in an interference fit.

17. The method of claim 16, wherein the steps of providing a second component and forming a cylindrical wall on the second component are performed simultaneously.

18. The method of claim 16, wherein the step of forming at least one helical flute on the cylindrical wall includes forming a plurality of flutes.

19. The method of claim 16, further comprising forming at least one additional stud on the first component and forming at least one additional cylindrical wall on the second component.

20. A fastener assembly for securing a first molded component to a second molded component, comprising:
   a stud that is a molded part of the first component and extends outward from the first component, the stud defining a smooth outer cylindrical surface,
   a cylindrical wall that is a molded part of the second component;
   a longitudinal bore defined by the cylindrical wall; and
   at least one flute extending radially from the cylindrical wall into the bore and longitudinally along the cylindrical wall in a helical manner, wherein the flute includes a crest formed by the intersection of a curved surface and a planar surface and wherein the intersection of the two surfaces define a bisector line which is inclined in a direction towards an open end of said bore, whereby upon insertion of the stud into the bore through said open end of said bore the flute contacts the outer cylindrical surface of the stud and thereby secures the stud in the bore of the cylindrical wall in an interference fit.

* * * * *